United States Patent [19]
Carter

[11] 3,961,442
[45] June 8, 1976

[54] PORTABLE GREENHOUSE

[76] Inventor: Martin F. Carter, Rte. 4, Box 374, Kingston, Tenn. 37763

[22] Filed: July 29, 1974

[21] Appl. No.: 492,467

[52] U.S. Cl. ........................................... 47/17; 52/63
[51] Int. Cl.² .......................................... A01G 9/00
[58] Field of Search .......................... 47/17; 52/63

[56] References Cited
UNITED STATES PATENTS

| | | | |
|---|---|---|---|
| 2,046,600 | 7/1936 | Atkinson | 47/17 |
| 2,046,601 | 7/1936 | Atkinson | 47/17 |
| 2,062,972 | 12/1936 | Gertz, Sr. | 47/17 |
| 2,765,362 | 10/1956 | Lindgren | 52/63 X |
| 2,827,138 | 3/1958 | Roy, Jr. | 47/17 X |
| 3,028,872 | 4/1962 | Gresswell | 47/17 X |
| 3,453,786 | 7/1969 | Rebarcher | 52/63 |
| 3,765,134 | 10/1973 | Gilchrist | 47/17 X |

*Primary Examiner*—Stephen C. Pellegrino
*Attorney, Agent, or Firm*—Martin J. Skinner

[57] ABSTRACT

An improved greenhouse which is of portable type, the greenhouse having the advantage of being very quickly and easily assembled or disassembled, the device consisting of opposite side panels and opposite end panels so to form upstanding walls, at least one end wall including a door, and the upper edges of the walls supporting a row of upwardly arched roof ribs that support a plastic canopy.

2 Claims, 10 Drawing Figures

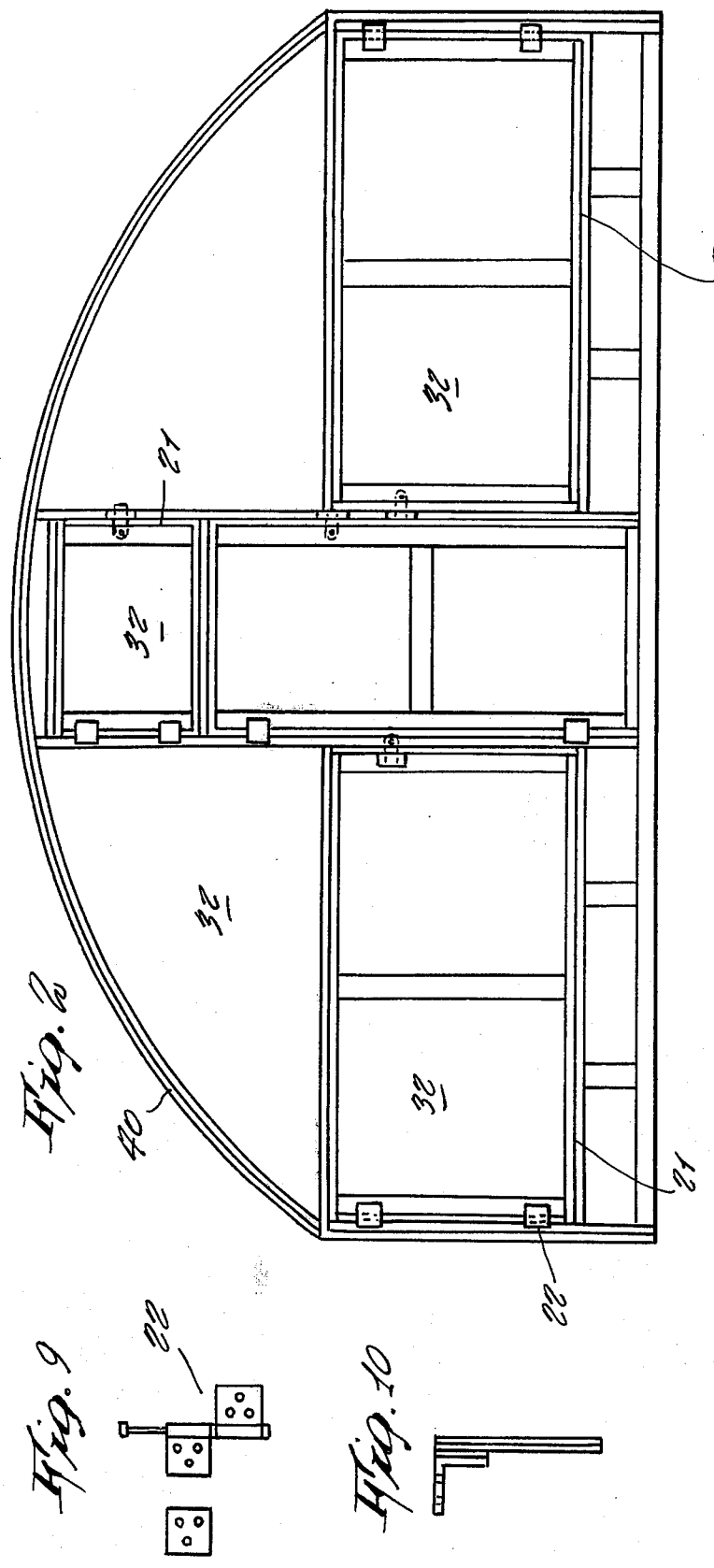
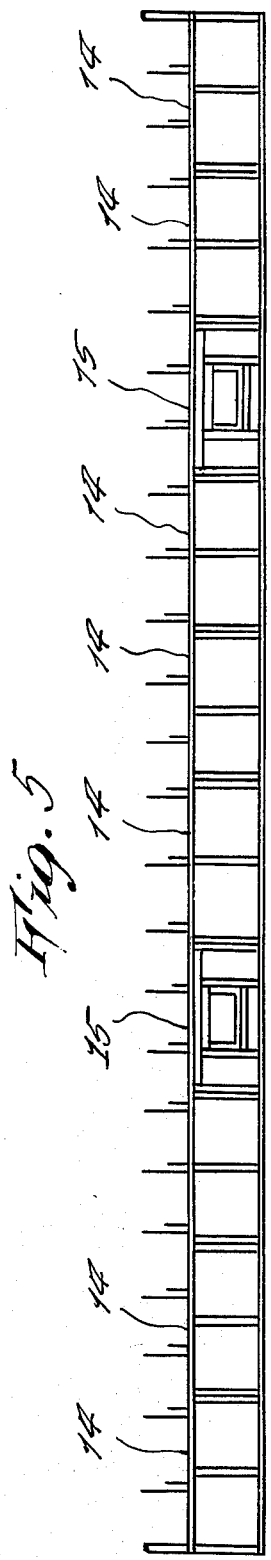

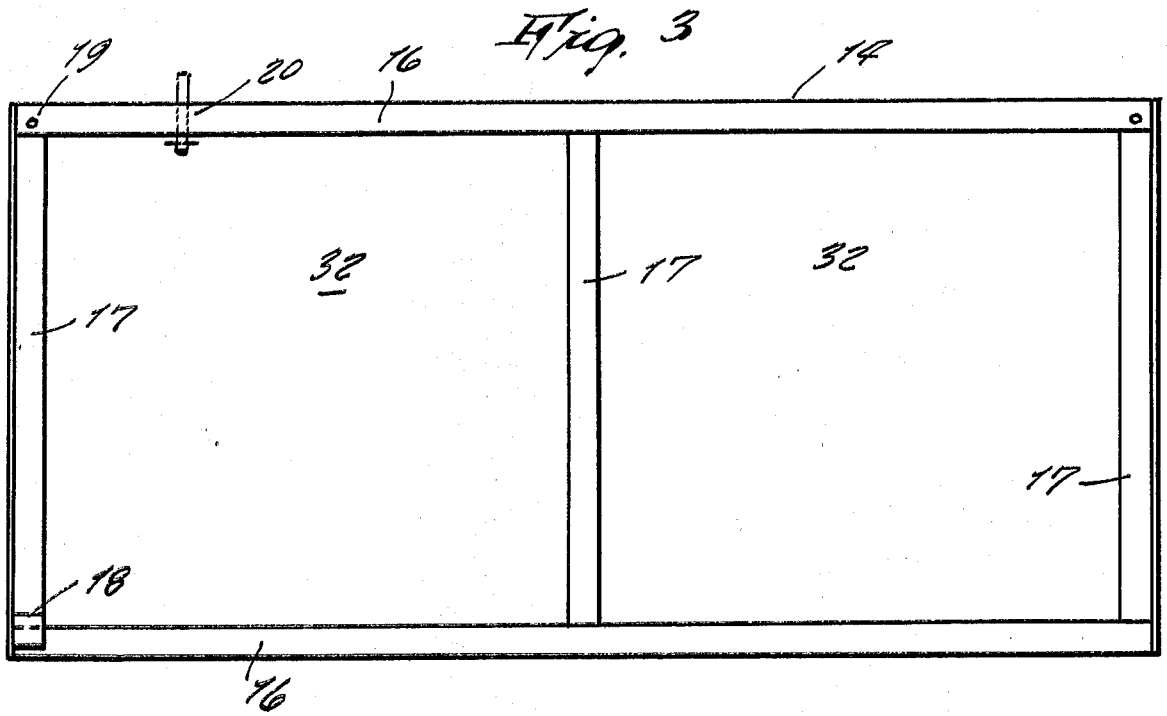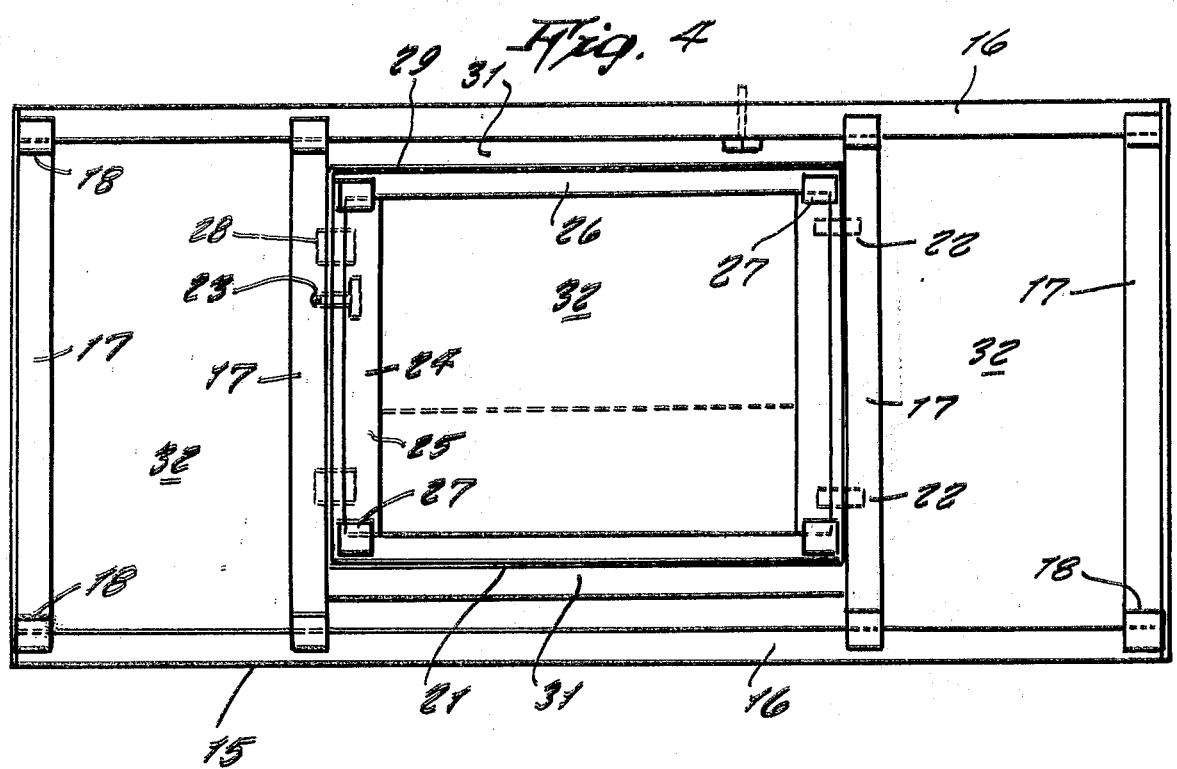

PORTABLE GREENHOUSE

This invention relates generally to greenhouses.

A principal object of the present invention is to provide a portable greenhouse that is very versatile because it can be quickly and easily assembled or disassembled.

Another object of the present invention is to provide a portable greenhouse which can be readily erected upon uneven ground.

Another object of the present invention is to provide a portable greenhouse that can be made in any size, which may be made air tight so that it can be suitably heated in cold weather, and which is ideal for growing all kinds of plants.

Other objects of the present invention are to provide a portable greenhouse which is simple in design, inexpensive to manufacture, rugged in construction, easy to use and efficient in operation.

These and other objects will be readily evident upon a study of the following specification and the accompanying drawings, wherein:

FIG. 2 is a front end view thereof;

FIG. 3 is an elevation view of a side section detail;

FIG. 4 is an elevation view of a door detail for a side section;

FIG. 5 is an elevation view of a greenhouse illustrating the use of a plurality of side sections of the types shown in FIGS. 3 and 4;

FIG. 9 illustrates a hinge detail;

FIG. 10 illustrates a sill stake.

Figure 1:
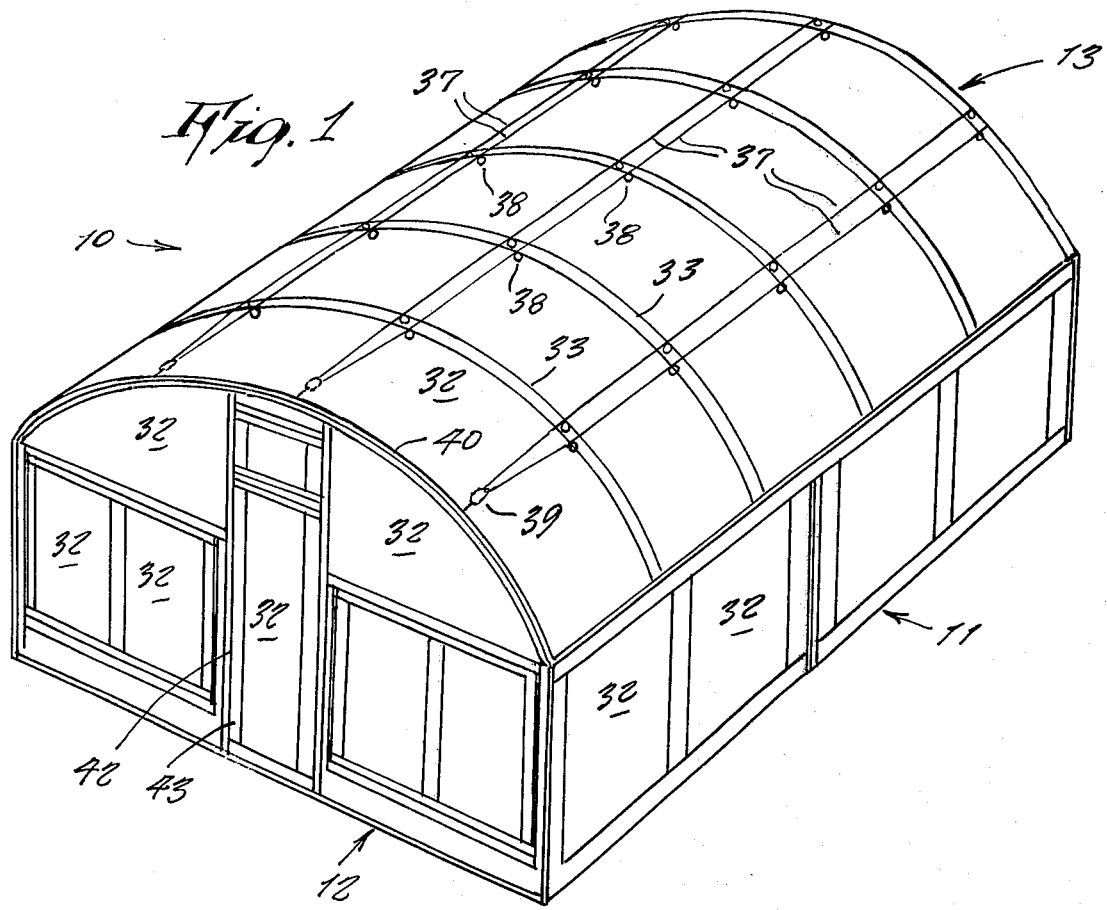
FIG. 1 is a perspective view of the present portable greenhouse invention.
Figure 7:
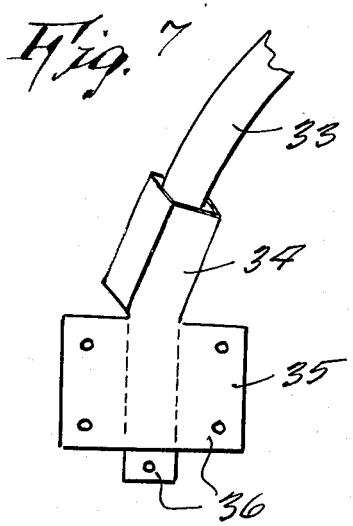
FIG. 7 illustrates an inside roof support mount.

Referring now to the drawings in detail, the reference numeral 10 represents a portable greenhouse according to the present invention wherein the same includes opposite side walls 11, opposite end walls 12 and an upwardly arched roof 13.

Each of the side walls are comprised of a plurality of sections 14 such as is shown in FIG. 3 or sections 15 such as is shown in FIG. 4. These sections may be readily bolted together. The section 14 is constructed of horizontal red wood beams 16 joined by vertical studs 17 as shown. Gussets 18 may be incorporated at the corners for a purpose of providing stability against collapse of the structure. Over sized bolt holes 19 are provided for receiving bolts for joining the sections together. Typically metal bars (not shown) overlap the junction of a pair of side sections near their top edges, one on the inside and the other on the outside of the greenhouse, and each are provided with holes corresponding to the holes 19. Bolts (not shown) pass through holes in both bars and holes 19 to fasten the side sections together. Vertical holes 20 (one shown) are provided along the upper beam 16 for a purpose of securing the roof ribs 33 thereto.

The side section 15 is shown to include a door 21 in addition to the above described structural frame comprised of horizontal beams 16 and vertical studs 17. The door is supported on hinges 22 and is secureable in closed position by means of a latch handle combination 23. The door 21 is likewise comprised of a frame 24 consisting of vertical members 25 joined at the corners by horizontal members 26. Gussets 27 are provided so to keep the door from warping or bending out of shape. A door stop 28 limits the door pivotal travel when swung into a closed position. A foam rubber or other resilent material 29 is fitted around the door so that it snuggly fits within a door way 30 so to render the portable greenhouse air tight. Such foam rubber or other resilent material eliminates the necessity of a precision construction while at the same time including the advantageous features thereof. Horizontal members 31 between studs 17 form the door way opening 30.

A flexible, inexpensive plastic film or sheeting 32 is secured across the entire section 14, section 15 and the door so to form an air tight wall. This film is attached using any conventional means, such as lathing strips overlaying the film and nailed into horizontal and vertical members.

The roof 13 is comprised of a row of upwardly arched ribs 33 across an upper side of which the plastic sheeting 32 is rested, the ribs being comprised of tubing or rod which at their opposite ends are fitted into inside roof support mounts 34 or the aforesaid holes 20, the mount 34 being integral with plate 35 having mounting openings 36 for receiving bolts that are passed through openings of the wall sections. The roof sheeting extends over the top edges of the side and end walls and is attached thereto as described above.

The ribs 33 may be supported against tilting by means of a plurality of wire braces 37 that extend transversely to the ribs and which are secured thereto by means of wire loops 38. The wire braces at one end are secured to turn buckles 39 secured to an upwardly arched laminated wood end support 40, so to allow taking up the wire braces in order that they are rigid for securely holding the ribs. Additionally, not shown, angular braces pivotally anchored at one end to a ground anchor are pivotally attached at their upper ends to the upper edges of the side walls, as at the exterior joining bars, in order to prevent wall spread apart due to the weight of the roof. Such bracing structure incorporates turn buckle bars 41 that may be taken up as necessary.

As illustrated in FIG. 1, the end panels can incorporate a relatively tall door 42 so to allow a person to walk into the greenhouse, such door 42 like wise comprising a frame 43 fitted with the plastic sheeting 32. The area between the laminated wood end supports 40 and the upper edge of the end sections shown in FIG. 1 is likewise filled with plastic sheeting 32, thus completely enclosing the interior of the greenhouse from the exterior atmosphere. The end walls are releasably attached to the ends of the side walls (terminal side sections) with bolts, removable nails or similar means.

Figure 6:
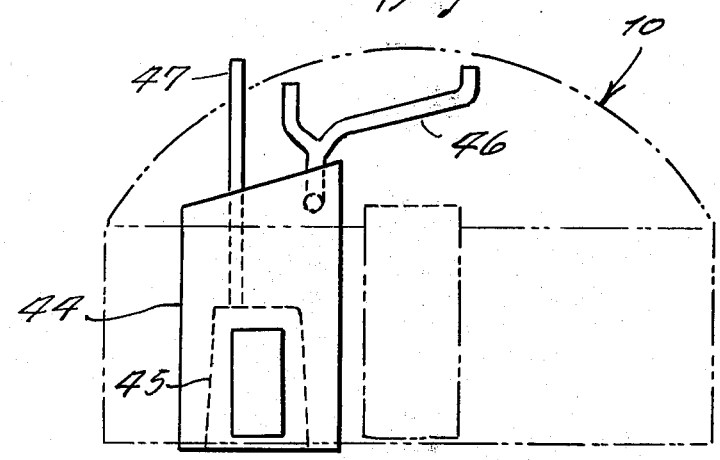
FIG. 6 is an end elevation view of the portable greenhouse and shown with a house along side having a heating unit connected to the greenhouse.
Figure 8:
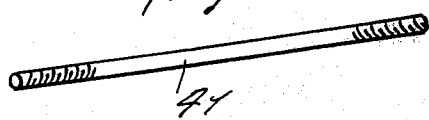
FIG. 8 is a perspective view of an outside brace bar having right and left hand threads at opposite ends.

As shown in FIG. 6, a separate house 44 can be installed adjacent the greenhouse 10, the house 44 being likewise portable and including a heating unit 45 that uses either coal, wood or oil, and which is connected by means of ducts 46 to the interior of the portable greenhouse 10. A chimney 47 extends from the heating unit 45 to the exterior atmosphere.

Thus there is provided a portable greenhouse having all the qualities of a conventional greenhouse beside having the advantage that it can be quickly and easily assembled or disassembled so that it may be relocated, as needed.

While various changes may be made in the detail construction, it is understood that such changes will be within the spirit and scope of the present invention as is defined by the appended claims.

What I now claim is:

1. An inexpensive portable greenhouse capable of being easily disassembled for storage and thereafter quickly reassembled for use at any location, which comprises:
    a pair of substantially parallel vertical side walls formed from a plurality of rectangular side sections, each side section having a top beam provided with a hole therethrough near each end, and each side section being joined to an adjoining section in an end-to-end relationship with a fastening member having releasable fasteners passing through the holes in the top beams of adjoining sections, the fasteners being smaller in diameter than the holes;
    a pair of vertical end walls attached with releasable fasteners to terminal side sections and having a rectangular lower portion and an upwardly arched upper portion;
    a closely fitting pedestrian door in at least one end wall for ingress and egress to the greenhouse;
    a clear plastic sheeting individually covering and attached to each of the side sections, the end walls and the door;
    a plurality of angular braces substantially equally spaced along the side walls connected between the top beams of the side sections and ground, the braces including length adjusting means to permit adjusting the side walls to vertical orientation;
    a plurality of upwardly arched, substantially equally spaced roof ribs extending between the side walls with ends of the ribs being in receptacles at the top beams of the side walls, the arch of the ribs substantially conforming to the arched shape of the upper portion of the end walls; and
    a clear plastic sheeting laid over the roof ribs and attached to the top beams of the side and end walls with removeable fasteners whereby the greenhouse is completely enclosed so as to be substantially airtight.

2. The greenhouse of claim 1 further comprising ventilating doors in a portion of the side sections and in the end walls, the ventilating doors each being covered with clear plastic and provided with: vertical hinges attached to the side sections and end walls; a closure latch handle; a resilient sealing element about their periphery to ensure an airtight greenhouse when the ventilating doors are closed; and door stops to limit pivotal movement of the ventilating doors about their hinges.

* * * * *